United States Patent Office 3,052,307
Patented Sept. 4, 1962

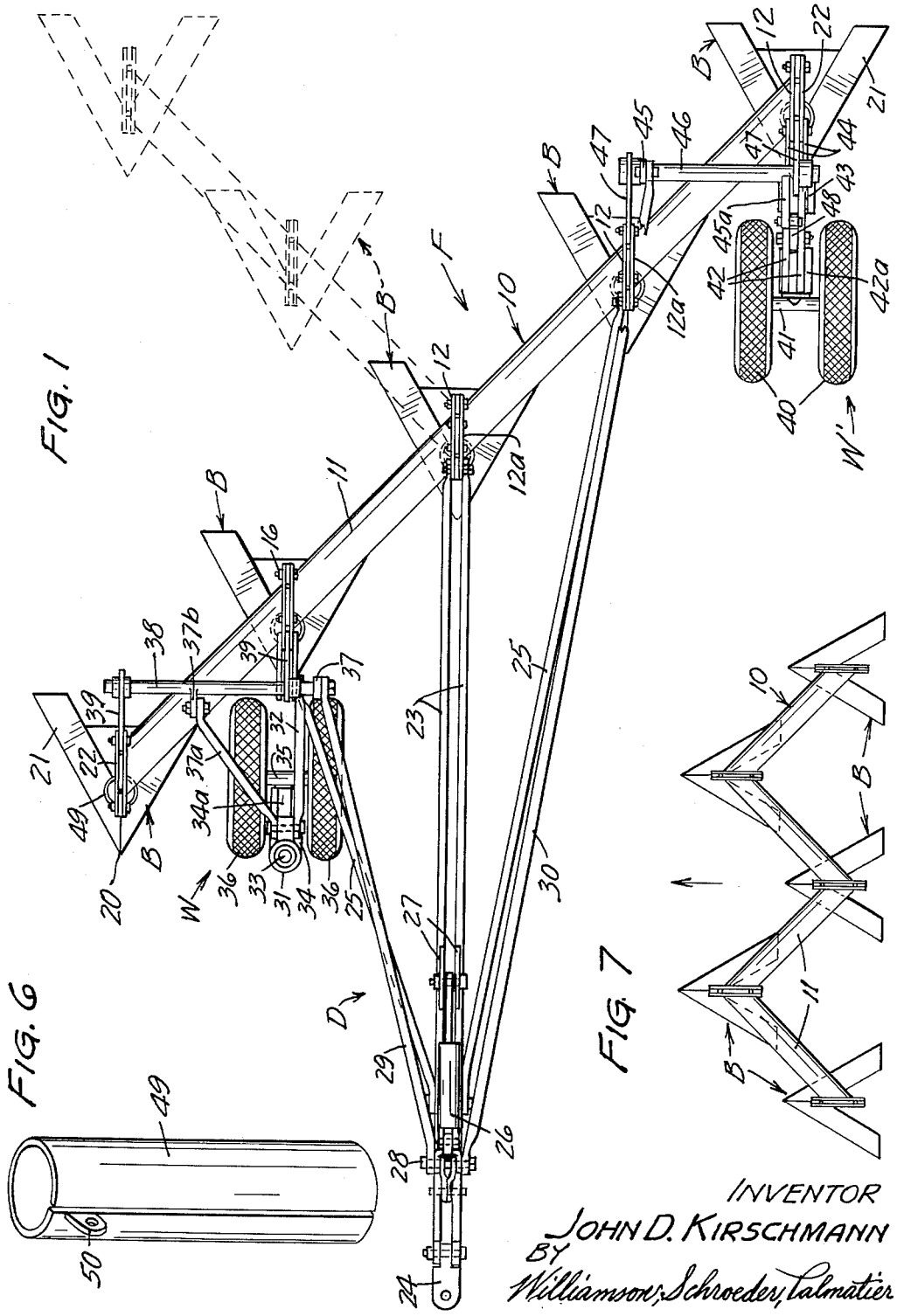

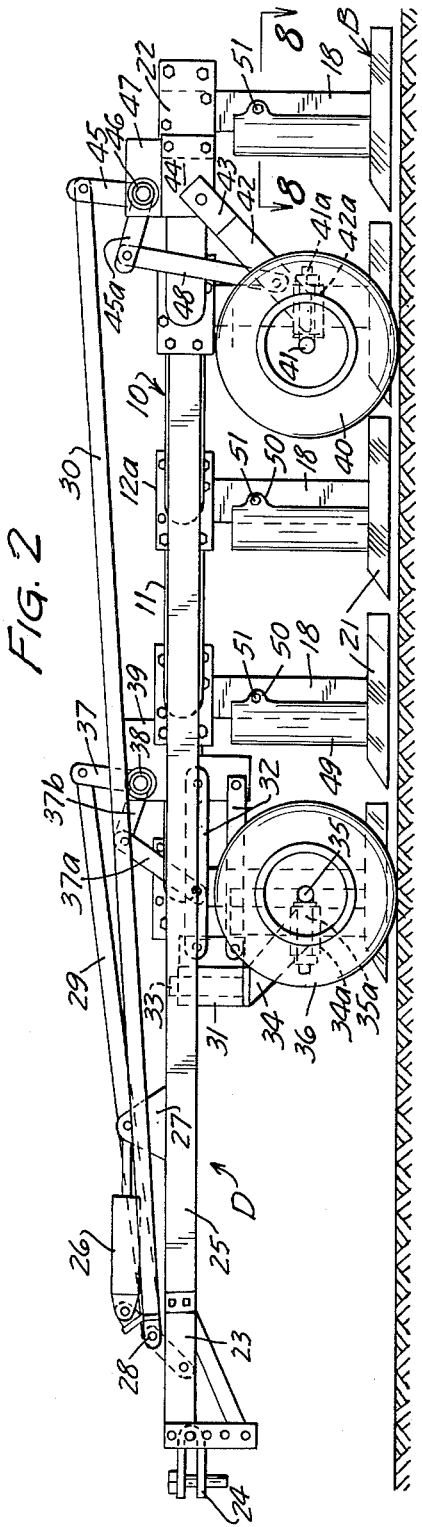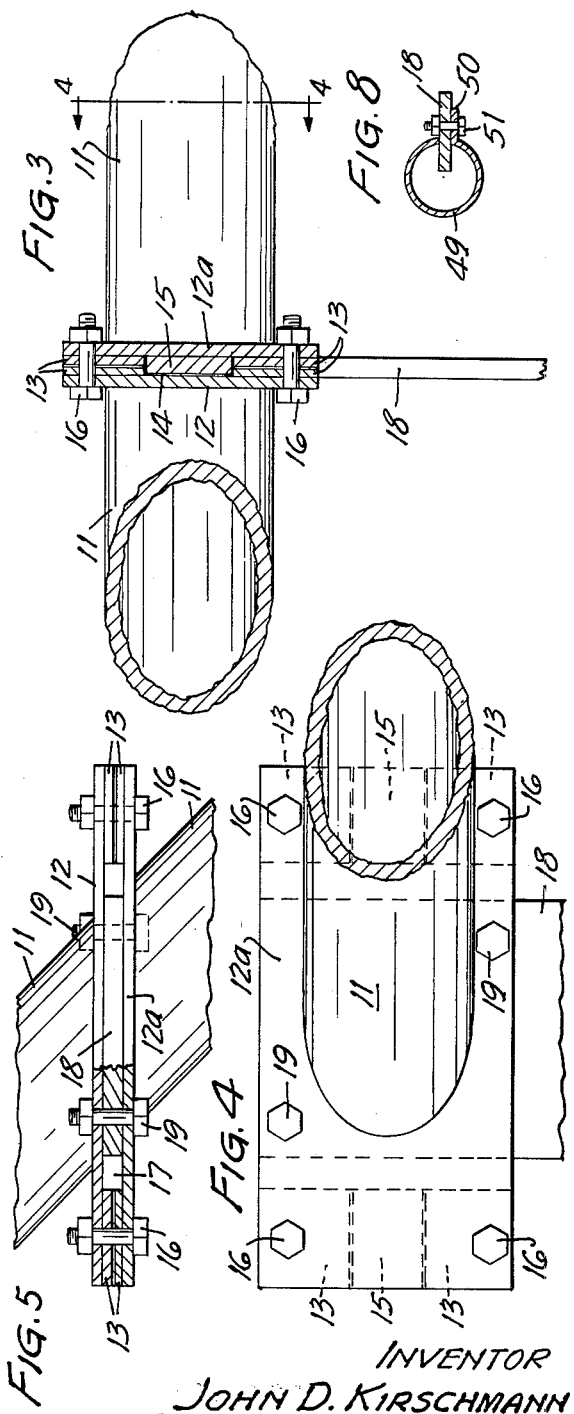

3,052,307
CULTIVATOR APPARATUS FOR
SUB-SOIL OPERATION
John D. Kirschmann, 1113 N. Washington St.,
Bismarck, N. Dak.
Filed Oct. 19, 1959, Ser. No. 847,324
9 Claims. (Cl. 172—253)

This invention relates generally to ground traversing cultivating and soil conditioning equipment and in particular to an implement particularly suited for employment in advanced methods of stubble-mulch tillage and soil preparation.

An important object of this invention is a stubble-mulch cultivator of novel design and construction which is particularly effective in breaking the soil hard pan below plow depth to fight drought conditions and erosion by wind and water run-off by loosening the soil to full depth, thereby enabling the soil to soak up the rain and spring run off to a deep depth of penetration and hold and conserve said moisture while minimizing evaporation.

Still another object is an especially effective stubble-mulch cultivator of the class above described which is particularly effective in improving soil conditions to enable the farmer to realize greater profits through increased yields.

Still another object is a cultivator of the class above described which is adapted to cultivate a plurality of rows simultaneously and is adapted to leave the stubble standing and the mulch undisturbed to snare the winters snow and hold it fast from the wind while loosening and opening the soil therebelow to make the same more porous by including crop residue therein, enabling the same to soak up moisture and restore nitrogen through natural residue decaying action while preventing run-off of moisture therefrom.

A still further object is a cultivator of the class described which is particularly effective in killing fall weeds and minimizing the re-seeding thereof.

Still another object is a cultivator of the class described which is particularly designed to provide unyielding strength and capable of heavy duty work while requiring a minimum of pulling power therefor.

Still another object is a cultivator implement of the class described which is especially designed and engineered for proper soil shingling, easier penetration and depth control thereof.

Still another object is an implement of the class described having a novel frame of unyielding strength which will remain rigid and true for the life of the unit and which is readily variable in size to accommodate a variable number of cultivating tools.

Still another object is a cultivator of the class described in which the cultivating tools are strategically placed with respect to one another to obtain the maximum effectiveness of said tools and implement during use.

Still another object is a cultivator of the class described employing a plurality of detachable interlocking frame units which are especially designed to provide maximum strength of frame while substantially reducing the strain or stress on the fastening members joining said units together as a rigid unit.

Still another object is a cultivator of the class described having a novel trash guard for the tool shank for use in heavier stubble and which eliminates bunching of the stubble on the shanks, and may also lay the soil over the weed seeds and crop residue to hasten decaying action while leaving the stubble standing and which is easily installed by the manipulation of a single fastening element.

Still another object is a cultivator of the class described having a novel frame employing a plurality of interlocking units which are especially designed to not only promote longer life of the frame and resist stress and strain thereon and to the bolts fastening same but which are also especially adapted to assemble the units and the cultivator tools carried thereby in a variety of formations and sizes depending on the particular desires of the operator.

Still another object is a cultivator of the class described featuring a novel interlocking arrangement between the frame units which not only provides a strong rigid frame but is also especially adapted to facilitate the attachment and removal of the tool shanks in mounted engagement with said frame.

These and other objects and advantages of my invention will more fully appear from the following description made in connection with the accompanying drawings wherein like reference characters refer to the same or similar parts throughout the several views, and in which:

FIG. 1 is a top plan view of one form of my invention;

FIG. 2 is a side elevational view of the form of my invention illustrated in FIG. 1;

FIG. 3 is a detail side elevational view on an enlarged scale of the interlocking joint between the frame sections or units;

FIG. 4 is a vertical cross sectional view taken on the line 4—4 of FIG. 3;

FIG. 5 is a top plan view in partial section of FIG. 3;

FIG. 6 is a perspective detail view on an enlarged scale of the tool shank trash guard of my invention; and FIG. 7 is a diagrammatic view of another frame formation capable of assembly by the frame units of my invention.

FIG. 8 is a horizontal sectional view taken on the line 8—8 of FIG. 2.

Reference is now made to the drawings for a more detailed description of my invention. Referring to the form of my invention illustrated in FIGS. 1 and 2, the stubble-mulch cultivator of my invention includes generally a main frame F which is adapted to have a plurality of cultivator shovels or blades B suspendingly mounted therefrom, said frame being mobilely supported by the dual wheel units W and W' for travel over the ground and provided with a suitable draft unit D.

The frame F consists of a plurality of elongate frame sections or units 10 which are all identical in nature. Each of said sections or units 10 include an elongated rigid tubular body portion 11 which when mounted are generally horizontally disposed and inclined to or offset from the line of travel at an angle of about 45 degrees. The body portions 11 are provided at each end with plate-like attachment or mounting members 12 and 12a which are vertically disposed in a plane generally parallel to the line of movement and offset at about 45 degrees from the longitudinal axis of the body portion 11.

The mounting plates 12 and 12a are fixedly secured to the tubular body portions 11 and are preferably of the same size and shape which is rectangular in the form shown, so that any one of the units 10 may be rotated through 180 degrees and connected to another unit so as to be disposed at right angles to one another to form a V formation as best seen in FIG. 7 and the broken line formation of FIG. 1 for a purpose hereinafter to be described.

The attachment plates 12 of each section are adapted to be joined with the plate 12a of the adjoining section to form the rigid joint therebetween. The joint represented by the cooperative uniting of the plates 12 and 12a is provided with interlocking means therebetween to hold the plates 12 and 12a apart for receiving the tool shank therebetween and to prevent relative twisting movement between the plates and prevent shearing of the fastening members clamping the plates together. In the form shown, the interlocking mechanism consists of four small abutment plate members 13 rigidly secured to the face of one of the attachment plates 12 as by welding and disposed adjacent the corner portions thereof so as to be in spaced apart relationship with one another. The vertically spaced abutment members 13 adjacent each end of the plates 12 define a recess or seat 14 therebetween, each of the recesses 14 being adapted to snugly and removably receive and seat therein contiguously with the abutment members 13 one of the lock or spacer blocks 15 secured to the face of the opposing attachment plate 12a as by welding, each of the blocks 15 being located adjacent one of the ends of the plate 12a. The opposing plates 12 and 12a are detachably joined together by suitable fastening elements such as the bolts 16 which are inserted through suitably aligned apertures provided in the attachment plates 12. Thus, when the blocks 15 are fitted between the abutment plates 13 and seated in the recesses 14, the blocks 15 and plates 13 cooperatively engage to prevent any twisting or rotational movement between the attachment plates 12 and 12a and thereby prevent any shearing stress from being applied to the bolts 16 during use and preventing failure of the joint.

The longitudinal spacing between the abutment plates 13 and the lateral spacing between the faces of the attachment plates 12 and 12a provides a vertically disposed opening 17 adapted to removably receive the upper end portion of the tool shank 18 to mount the shank between the plates 12 and 12a and suspend the soil loosening blades or shovels B, which are mounted on the lower ends of the shanks, from the supporting frame. The shanks 18 are insertable between the joined attachment plates 12 and 12a and are detachably mounted therebetween by means of suitable shear pins 19 inserted in suitably aligned apertures provided in the plates 12 and 12a and the shank 18. Thus, the cultivating tools may be easily mounted on or dismounted from the frame without disconnecting the frame sections 10. This arrangement also serves to protect the blades B and shanks 18 when striking heavy, embedded objects, since the arrangement permits the pins 19 to readily shear under such stress and relieve the strain on the blades and shanks to prevent damage thereto. The shanks 18 are thin, flat and elongate in nature and of rigid construction to prevent warpage or breakage thereof, the shanks being vertically disposed and lying in a plane generally parallel to the line of travel, thereby presenting the narrowest thinnest portion of the shank to the soil to reduce the drag on the frame and to eliminate any substantial disturbance of the soil as the shanks pass therethrough.

The blades B are mounted on the lower ends of the shanks 18, and in the preferred form shown are V-shaped in configuration, with the apexes 20 thereof directed forwardly in the direction of the line of travel, the shovel apexes and shanks normally travelling between the rows of standing stubble. The leading faces 21 of the blades are inclined upwardly and rearwardly and are adapted to cut and raise the soil as it passes therethrough to loosen and shingle the same for better moisture retention thereof without turning over and materially disturbing the soil, thereby minimizing evaporation and loss of moisture. Because of the inclined disposition of the frame sections 10, the blades B are staggered with respect to those immediately adjacent thereto. The blades B are of such a width that they overlap the blades adjacent thereto, the blades thereby cooperating to cut and loosen a continuous swath or layer of soil beneath the surface, including the soil beneath the stubble, which remains standing and undisturbed due to the fact that the blades operate at a depth or level which will not interfere with the stubble. Thus, the cultivating apparatus of my invention effects a deep sub-surface plateau of loosened soil particularly suitable for receiving and holding large quantities of moisture to prevent run-off and loss thereof and create a reservoir of moisture for the crops particularly when dry spells occur.

It will be noted that the ends of the frame sections 10 located at the opposite extreme ends of the frame F are provided with clamping plates 22 which correspond to the attachment plates 12 or 12a depending on which end they are attached to but are not attached to any tubular body member and are employed to clamp a shovel shank to each end of the frame F.

The draft unit D comprises a main center draft member 23 preferably formed of a slotted beam the rear end of which is affixed to the frame by removable attachment to the centermost joint formed by the opposing attachment plates 12 and 12a. The forward end of the center draft member 23 is provided with a forwardly extending bifurcated conventional hitch member 24 for suitable attachment to the draft tongue carried by the tractor. The draft unit also includes diagonally disposed bracing members 25 which are detachably connected at one end to the frame F by removable attachment to the mounting plates 12 and 12a disposed to the side of the center line of the frame, the leading ends of each of said braces 25 being secured to the center draft member 23. The center draft member 23 has mounted atop thereof adjacent the leading end thereof an hydraulic motor 26, one end of which is secured to the draft member 23 by means of a pair of upstanding ears 27 which are rigidly secured to the draft member 23. The other end of the hydraulic motor 26 is drivingly connected to a common drive link 28 which interconnects the forward ends of the control rods 29 and 30 which extend diagonally and rearwardly to raise and lower the frame with respect to the wheel units W and W' to selectively move the blades B into working engagement or elevated transport condition and to adjust the depth of cut as desired.

The leading wheel unit W operates as a crazy or caster wheel and includes a vertical journal or bearing sleeve which is rigidly mounted on the frame F by means of rigid forwardly extending supporting members 32. The bearing 31 is adapted to pivotally mount therein a vertical arbor or axle 33 which is attached to a generally downwardly and rearwardly inclined wheel axle supporting shank 34, having a horizontal bearing portion 34a which is adapted to support a wheel axle 35 upon which are rotatably mounted a pair of suitable wheels 36. The bearing 34a has a longitudinal bore which receives a stub shaft 35a transversely secured to the axle 35 to enable the wheels to swing about a horizontal as well as a vertical axis.

The frame F is raised and lowered with respect to said caster wheel unit W by means of the bell crank lift arm 37 which is selectively actuated by the reciprocating movement of the control rod 29, which lift arm 37 is mounted on a connecting rod 38 which is rotatably connected to the frame F by means of mounting brackets 39, one end of which supports the connecting rod 38, the other ends of which are mounted between the attachment plates. The bell crank 37 is pivotally connected to the supports 32 by means of link 37a which is pivotally connected to the lower arm 37b of the bell crank also mounted on the rod 38.

The other wheel unit W' also includes a pair of dual wheels 40 which are rotatably mounted on an axle 41 which is pivotally mounted on a strut member 42 having a forked yoke or bifurcated upper end portion 43 which is pivotally mounted on a supporting bracket 44 extending forwardly from the last or end attachment plate and clamping plate 22. The axle 41 is pivotally mounted on the lower horizontal bearing end 42a of the strut 42 by means of a stub shaft 41a which is rotatably received in a suitable longitudinal bore in the bearing 42a of the strut 42 and has the axle 41 secured to the front end thereof so that the axle is disposed transversely to the bearing 42a for swinging movement about the longitudinal horizontal axis thereof. Thus, the wheel units W and W' are free to swing up and down about longitudinal horizontal axes to enable the wheels to adjust to ground irregularities without interfering with the depth of cut of the blades. The frame F and the blades B carried thereby are raised or lowered as desired with respect to said wheels by means of the bell crank lift arm 45 which is mounted on a rotatable connecting rod 46 which is supported by a pair of mounting plates 47 extending from between adjacent pairs of attachment plates. The lower leading end 45a of the bell crank 45 is mounted on the rod 46 and pivotally connected to the upper end of a generally vertical connecting link 48, the lower end of which is pivotally connected to the wheel strut 42, the frame and blades B being raised or lowered by actuation of the bell crank 45 by the control rod 30. The dual wheel units W and W' previously described are especially effective on the larger units and provide additional buoyancy on soft ground and stabilize the blade penetration.

In some operations, particularly where heavier concentrations of stubble are encountered, I prefer to employ a detachably mounted trash guard which consists simply of a single sheet of somewhat flexible resilient spring type sheet metal which is bent into a generally circular sleeve 49 which is adapted to be opened sufficiently so that the disconnected ends may be disposed on opposite sides of the shovel shank 18 to enclose and overlie the leading edge of the shank 18 and provide a convexly curved or bull-nose guard therefor. The resilient nature of the sleeve 49 tends to press the disconnected ends of the sleeve 49 against the sides of the shank 18. However, to prevent the trash guards from being accidentally displaced from the shanks during use, the sleeve 49 is provided with a laterally extending apertured ear 50 adjacent one marginal edge thereof which is adapted to receive a set screw 51 for providing a more secure attachment of the sleeve to the shank. If it is only desired to prevent the stubble from building up in front of the shank 18, then a trash guard of small cross sectional area is employed which is large enough only to provide a rounded or bull-nose front end for the shank 18 which is sufficient to prevent the stubble from building up in front of the shank by deflecting the stubble and crop residue and causing the same to disburse to each side thereof as the blades and shanks are drawn through the soil.

However, in some instances it is desirable to turn the upper layers of the soil as well as shingle that portion of the soil below the average plow depth. In such instances, a trash guard of larger cross-section is employed which is of sufficient size to bull-nose the dirt over the stubble usually lying in the rows and lays the soil over weed seeds and crop residue to hasten decaying action while leaving the stubble standing.

It should be noted that one of the important advantages of my invention lies in the versatility of the multi-section frame. Not only can the frame be lengthened or shortened as desired, but the angular relationship between the tubular body portions 11 and the attachment plates 12 and 12a of each frame section enables a variety of frame formations or arrangements to be selectively employed as desired. The solid line aligned formation of FIG. 1 is a preferred arrangement but the broken line wedge formation of FIG. 1 and the zig-zag formation of FIG. 7 illustrates other formations which may be employed if desired to accommodate various situations, which arrangements may be accomplished simply by rotating adjacent sections 180 degrees with respect to one another.

From the foregoing, the advantages of my invention are readily apparent. The cultivator disclosed herein is especially effective in shingling the soil and loosening same to enable the soil to more effectively retain moisture to fight drought and erosion. The cultivator permits the stubble to remain standing to snare and retain winter snows and without disturbing the mulch.

The novel frame design and construction provides versatility and variation in size and formation or arrangement of the component parts while providing an unyielding strength of construction. The novel interlocking mechanism between frame sections adds to the strength of construction by preventing shearing of the fastening bolts. The diagonal disposition of the body portions of the frame to the line of travel also contributes to this strength of construction by reducing the strain on the joints. The blade shanks are easily mounted and dismounted from the frame and are protected when encountering heavy embedded objects to prevent permanent damage thereto. The trash guards prevent build-up of stubble and crop residue around the shank and may also be employed to lay the soil over the crop residues to hasten the decay thereof.

The alignment shown in FIGS. 1 and 2 is the preferred form of my invention since it provides for more uniformness and less rigidness in the field than by any implements previously available. The interlocking structure of the frame members provides an exceptionally strong rigid frame which resists twisting and eliminates the strain on the bolts and provides for long life thereof. The arrangement also provides the shanks to be readily attached and detached from mounted engagement with the frame F. The shanks and shovels are engineered and designed to promote proper soil shingling, easier penetration and depth control while effecting a minimum of drag to enable a minimum of pulling power to be required. By loosening the sub-soil to a considerable depth without actually turning over the same, the soil is placed in condition to sponge up or absorb the moisture and minimize the evaporation of rain and spring run-off which will penetrate to these depths and hold or imprison the water to prevent water erosion. The tiller also kills moisture robbing fall weeds and minimizes their reseeding as it breaks the hard pan down to the desired depth. Because of the particular interlocking features of the frame elements, the tiller of my invention may be varied in length as desired to accommodate the field conditions and the type of tractor available for use.

It will, of course, be understood that various changes may be made in the form, details, arrangement and proportions of the various parts without departing from the scope of my invention.

What I claim is:

1. Cultivating apparatus comprising an elongate rigid tool supporting frame adapted for travel over the ground, said frame including a series of corresponding frame sections removably joined to form said rigid frame, said sections comprising elongate generally horizontal body portions disposed diagonally to the line of movement, mounting members secured to the ends of said body portions and lying in a vertical plane disposed generally parallel to the line of movement, said sections being disposed in end to end relationship with the outer faces of the mounting members of each section in abutting relationship with the outer faces of each adjacent section, fastening means extending between and removably joining opposing mounting members to form a rigid joint therebetween, spacing elements between said opposing mounting members defining an opening therebetween for receiving the upper end portion of a vertically disposed shank member having an earth working tool mounted adjacent the lower end thereof, and means for removably securing said shank in said opening.

2. Cultivating apparatus comprising a rigid tool carrying frame supported for travel over the ground, said frame comprising a series of interchangeable elongate frame sections detachably interconnected in abutting end to end fashion to form said rigid frame, each of said sections comprising an elongate body portion horizontally disposed generally transversely of the direction of travel, mounting members secured to the ends of said sections, said members lying in vertical planes in general alignment with the direction of travel, said opposing members having vertically disposed spaced apart opposing wall portions defining a downwardly facing opening for receiving and holding between said opposing wall portions the shank of a cultivator tool suspended from said frame, fastening elements extending between abutting opposing members and holding them together, and interlocking means integral with each of said opposing mounting members and extending in opposite directions therebetween and adapted to clutchingly engage each other to thereby prevent rotational movement between said members and thereby reduce the shearing strain on said fastening elements, the body portions of said frame sections being diagonally disposed with respect to each of their mounting members, whereby the relative positions of the opposing mounting members may be reversed whereby adjacent sections may be joined with their respective elongate body portions in alignment with one another and may be optionally joined with their body portions angularly offset with respect to each other.

3. The apparatus of claim 1, wherein the body portions of said frame section are diagonally disposed with respect to each of their mounting members by the same degree of angular relationship whereby the relative positions of the opposing mounting members may be reversed, whereby adjacent sections may be joined with their respective elongate body portions in alignment with one another and may be optionally joined with their body portions angularly offset with respect to each other.

4. A cultivator frame for carrying cultivating tools and supported for travel over the ground comprising a series of elongate horizontally disposed frame members detachably connected together in end to end fashion to form a rigid frame unit, vertical plate like mounting members secured to the adjacent ends of adjoining frame members in opposition to one another, fastening means for removably holding said opposed mounting members together, and torque resisting interlocking means integral with said members including a socket provided by one of said mounting members, said socket facing said other member, and a male element integrally united to said other mounting member and extending towards and between said opposed mounting members and removably seated in said socket, said interlocking means providing positive clutching engagement between said opposing mounting members whereby said mounting members hold each other in relative rotation therebetween and relieve said fastening means of shearing stress thereon, the frame members being diagonally disposed with respect to each of their mounting members whereby the relative positions of the opposing mounting members may be reversed whereby adjacent frame members may be joined in alignment with one another and may be optionally joined in angularly offset relationship to each other.

5. Cultivating apparatus comprising a series of elongate horizontal interchangeable frame members butted together in end to end fashion to form a rigid frame, said frame members being diagonal to the line of travel, plate like mounting members secured to adjacent ends of adjoining frame members and lying in a vertical plane generally parallel to the line of travel in opposition to one another, said opposing mounting members having spaced apart opposing faces defining a downwardly facing opening for removably receiving the upper end portion of an elongate shank member to suspend said shank from said frame, fastening means extending through and between and detachably joining said opposing mounting members to form a rigid joint therebetween, interlocking spacer mechanism including means carried by one of said opposing mounting members extending from the face thereof towards said other member providing a socket facing said other member and a male member carried by said other opposing mounting member and extending from the face thereof towards the first named member and capable of being removably seated in said socket and engageable with the socket providing means whereby said mechanism prevents relative turning movement between said opposed members, and maintains the said opposing faces of said opposed members in spaced apart relationship.

6. The apparatus of claim 5 wherein said frame members may be reversed with respect to each other whereby they may be disposed in alignment with each other or angularly offset with respect to each other.

7. A frame for carrying cultivating tools comprising a series of individual elongate horizontal frame members generally transversely disposed with respect to the direction of travel and disconnectably butted together in end to end relationship to form a continuous frame, adjacent frame members having opposed abutting mounting members lying in a vertical plane in alignment with the direction of travel and adapted to be disconnectably fastened together, said frame members being angularly offset from their respective mounting members, the relative positions of the opposing mounting members being reversible whereby adjacent sections may be joined with their respective elongate body portions in alignment with one another and may be optionally joined with their body portions angularly offset with respect to each other.

8. A frame for carrying cultivating tools comprising a series of individual elongate horizontal frame members generally transversely disposed with respect to the direction of travel and disconnectably butted together in end to end relationship to form a continuous frame, the abutting end portions of adjacent frame members having interlocking clutching means integral therewith and extending therebetween whereby said members hold each other against relative rotation therebetween, said means including a pair of spaced apart first clutching elements integral with one of said frame members and extending towards said other opposed member, and a second clutching element integral with said other frame member and extending towards said first named frame member and seated in the space between said first clutching elements in contiguous side-by-side relationship therewith and adapted to clutchingly engage said first elements and thereby prevent relative rotational movement between said abutting frame members, said abutting end portions having vertically disposed spaced apart opposing wall portions defining a downwardly facing opening for receiving and holding between said opposing wall portions the shank of a cultivator tool suspended from said frame, said interlocking clutching means including said first and second clutching elements being provided both forwardly and rearwardly of said tool shank receiving opening so as to be positioned in front of and behind said tool shank when it is seated in said opening, and fastening means for disconnectably holding said abutting end portions together.

9. A frame for carrying cultivating tools comprising a series of individual elongate horizontal frame members generally transversely disposed with respect to the direction of travel and disconnectably butted together in end to end relationship to form a continuous frame, the abutting end portions of adjacent frame members being adapted for cooperative interfitting clutching engagement therebetween whereby said members hold each other against relative rotation therebetween, said abutting end portions having vertically disposed spaced apart opposing wall portions defining a downwardly facing opening for receiving and holding between said opposing wall portions the shank of a cultivator tool suspended from said frame, and fastening means for disconnectably holding said abutting end portions together.

References Cited in the file of this patent

UNITED STATES PATENTS

| | | |
|---|---|---|
| 1,246,851 | Biebinger | Nov. 20, 1917 |
| 1,304,631 | Tower | May 27, 1919 |
| 2,493,023 | Pointer | Jan. 3, 1950 |
| 2,575,428 | Rogers et al. | Nov. 20, 1951 |
| 2,619,890 | Larsen | Dec. 2, 1952 |
| 2,752,837 | Parker | July 3, 1956 |
| 2,762,286 | Dorsch | Sept. 11, 1956 |
| 2,764,421 | Ronning | Sept. 25, 1956 |
| 2,960,170 | Cantral | Nov. 15, 1960 |

FOREIGN PATENTS

| | | |
|---|---|---|
| 191,646 | Austria | Sept. 10, 1957 |
| 2,094 | Great Britain | Mar. 23, 1888 |